United States Patent Office 3,711,470
Patented Jan. 16, 1973

---

3,711,470
5-PHENYL-7-BROMO-1H-1,5-BENZODIAZEPINE-2,4-(3H,5H)-DIONES
Karl-Heinz Weber, Gau-Algesheim, Karl Zeile and Peter Danneberg, Ingelheim am Rhein, Rolf Giesemann, Bingen, and Karl Heinz Hauptmann, deceased, late of Ingelheim am Rhein, Germany, by Maria Hauptmann, heir, Bonn am Rhine, Germany, assignors to Boehringer Ingelheim G.m.b.H., Ingelheim am Rhein, Germany
No Drawing. Continuation-in-part of application Ser. No. 89,482, Nov. 13, 1970, which is a continuation of abandoned application Ser. No. 703,188, Feb. 5, 1968. This application Feb. 1, 1971, Ser. No. 111,714
Claims priority, application Germany, Feb. 7, 1967, P 16 70 190.9; Jan. 18, 1968, P 16 70 305.2, P 16 70 306.3
Int. Cl. C07d 53/04
U.S. Cl. 260—239.3 B                  6 Claims

---

ABSTRACT OF THE DISCLOSURE

Compounds of the formula

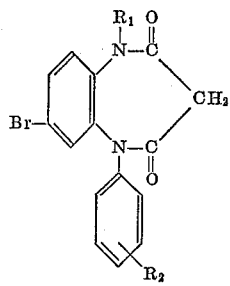

wherein
$R_1$ is hydrogen, methyl, ethyl, hydroxy-ethyl or (cycloalkyl of 3 to 6 carbon atoms)-methyl, and
$R_2$ is hydrogen or halogen;

the compounds are useful as psychosedative and anticonvulsives.

---

This is a continuation-in-part of copending application Ser. No. 89,482, filed Nov. 13, 1970, now abandoned, which in turn is a continuation of application Ser. No. 703,188, filed Feb. 5, 1968, now abandoned.

This invention relates to novel 5-phenyl-7-bromo-1H-1,5-benzodiazepine-2,4-(3H,5H)-diones and methods of preparing these compounds.

More particularly, the present invention relates to compounds of the formula

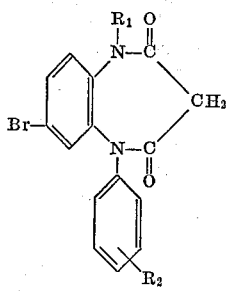

wherein
$R_1$ is hydrogen, methyl, ethyl, hydroxy-ethyl or (cycloalkyl of 3 to 6 carbon atoms)-methyl, and
$R_2$ is hydrogen or halogen.

The compounds according to the present invention may be prepared by a number of different methods involving well known chemical principles, among which the following have proved to be particularly convenient and efficient:

METHOD A

By cyclizing an N-phenyl-N-(2-amino-5-bromophenyl)-malonic acid lower alkyl ester amide of the formula

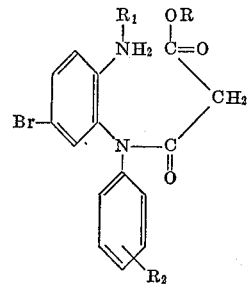

wherein R is lower alkyl and $R_2$ has the same meanings as in Formula I, and, if desired, subsequently alkylating the cyclization product in the 1-position.

METHOD B

By cyclizing a 2-amino-5-bromo-diphenyl-amine of the formula

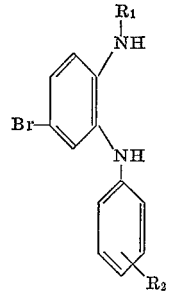

wherein $R_1$ and $R_2$ have the same meanings as in Formula I, with a malonic acid or alkylmalonic acid dihalide and, if desired, alkylating the cyclization product thus obtained in the 1-position.

In method A the hydrolysis and ring closure proceed smoothly and with good yields in an acid as well as an alkaline medium, preferably in the presence of an alcoholic or aqueous alcoholic solvent; however, other inert solvents such as tetrahydrofuran or dioxan, are also suitable; for acid cyclization, acetonitrile may also be used as the solvent. Mineral acids, and particularly hydrohalic acids, such as hydrochloric acid, hydrobromic acid, hydroiodic acid, sulfuric acid, phosphoric acid and perchloric acid are preferably used as acid cyclization agents. Examples of alkaline cyclization agents are sodium alcoholates and alkali metal hydroxides.

The reaction periods depend upon the quantity of acid or alkali employed and upon the type of solvent used; they vary between several hours and several days. The preferred reaction temperatures are preferably between +20° C. and the boiling point of the solvent which is used.

The preparation of an end product of the Formula I, wherein $R_1$ is unsubstituted or hydroxy-substituted alkyl, may be carried out in various ways. One may, for instance, start from a compound of Formula I wherein $R_1$ is hydrogen and exchange the same for an alkyl group with the aid of a customary alkylating agent, such as an alkyl halide or an alkyl sulfate, such as a dialkylsulfate. For this purpose an alkali metal salt of a compound of Formula I is dissolved or suspended in a suitable solvent, the alkylating agent is added to the solution or suspension, and the reaction mixture is heated. For the preparation of an end product of the Formula I wherein $R_1$ is hydroxyalkyl, a compound of the Formula I wherein $R_1$ is hydrogen may be reacted with an alkyleneoxide in the presence of a strong base, such as Triton-B. If the cyclization is carried out under alkaline conditions, the alkylation of the 1-position may also be effected after the cyclization is finished, without prior isolation of the 1-unsubstituted benzodiazepin-2,4-dione cyclization product. In this case the alkylating agent is added to the cyclization reaction solution containing the cyclization product, and the mixture heated.

In method B the reaction is preferably carried out in the presence of a suitable inert organic solvent, such as benzene, toluene, xylene, tetrahydrofuran, dioxan or dimethylformamide, at room temperature or, more advantageously, at the boiling point of the particular solvent which is used. In some cases the addition of a tertiary organic base, such as pyridine, has proved to have a favorable influence upon the course of the reaction. An end product of the Formula I, wherein $R_1$ is hydrogen, may optionally be subsequently alkylated, as described in conjunction with method A.

The N - phenyl-N-(2-amino-5-bromo-phenyl)-malonic acid lower alkyl ester amides of the Formula II used as starting materials for method A are also novel. They may be prepared by reacting a correspondingly substituted N-phenyl-N-(2-nitro-5-bromo-phenyl)-amine with a malonic acid monoalkyl ester halide to obtain an N-phenyl-N-(2-nitro-5-bromo-phenyl)-malonic acid alkyl ester amide, and subsequently reducing the nitro group according to the following reaction sequence:

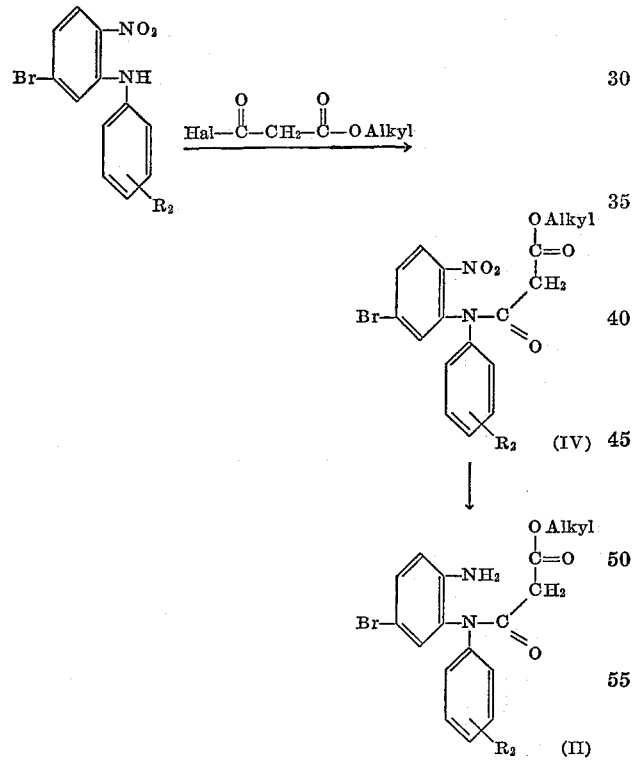

wherein $R_2$ has the same meanings as in Formula I.

Thus, the preparation of an N-phenyl-N-(2-nitro-5-bromo-phenyl)-malonic acid alkyl ester amide of the Formula IV is carried out, for example, by heating a solution of N-phenyl-N-(2-nitro-5-bromo-phenyl)-amine in a suitable solvent, such as benzene, toluene or xylene, with a malonic acid alkyl ester halide, whereby the nitro compound IV is always obtained with good yields (80%) and in crystalline form.

The subsequent reduction of compound IV may be effected by nascent or catalytic hydrogenation, for example, by hydrogenation with Raney-nickel or with a mixture of iron and glacial acetic acid.

For the cyclization to form the 5-phenyl-7-bromo-1H-1,5-benzodiazepine-2,4-dione end product of the Formula I it is not absolutely necessary to start from an isolated compound of the Formula II; instead, the solution containing the hydrogenated intermediate product II may directly be treated with the cyclization agents mentioned above, after removal of the catalyst.

The starting compounds of the Formula III wherein $R_1$ is hydrogen may be prepared by conventional methods, for example, by catalytic reduction of the corresponding 2-nitro-diphenylamine. Starting compounds of the Formula III wherein $R_1$ is alkyl may be obtained analogous to the method described in Chem. Berichte, vol. 34, p. 4204 (1902), and vol. 37, p. 552 (1904), that is, by cyclizing a 2-aminodiphenylamine with formic acid, alkylating at the nitrogen atom in the cyclization product by means of an alkyl iodide, and subsequently splitting the ring with an alkali.

The following examples further illustrate the present invention and will enable others skilled in the art to understand it more completely. It should be understood, however, that the invention is not limited solely to the particular examples given below.

EXAMPLE 1

5-phenyl-7-bromo-1H-1,5-benzodiazepine-2,4-(3H,5H)-dione by method A 25 gm. of the N-phenyl-N-(2-amino-5-bromo-phenyl)-amide of ethyl malonate (M.P. 117–118° C.) were added at room temperature to an ethanolic sodium ethylate solution prepared from 300 ml. of absolute ethanol and 2.5 gm. of sodium. The resulting solution was allowed to stand at room temperature for eight hours. The sodium salt of the malonic acid amide formed thereby precipitated out and was collected by vacuum filtration and dissolved in water. The resulting aqueous solution was acidified with concentrated hydrochloric acid, and the precipitate formed thereby was collected. 18 gm. (80% of theory) of 5-phenyl-7-bromo-1H-1,5-benzodiazepine-2,4-(3H,5H)-dione, M.P. 302–304° C., of the formula

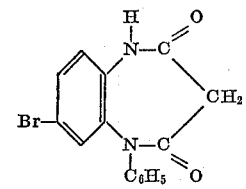

were obtained.

The starting compound was obtained in the following manner:

60 gm. of N-phenyl-N-(2-nitro-5-bromo-phenyl)-amine and 37 gm. of malonic acid ethyl ester chloride were dissolved in 500 ml. of benzene, and the solution was refluxed for 18 hours. Thereafter, the reaction solution was washed with aqueous sodium bicarbonate and with water, and the benzene was then substantially evaporated in vacuo. Upon addition of ethanol to the residue, 53 gm. of the N-phenyl-N-(2-nitro-5-bromo-phenyl)-amide of ethyl malonate, M.P. 93–96° C., crystallized out. 52 gm. of this product were dissolved in methanol, and the solution was hydrogenated at 6 atmospheres gauge at room temperature in the presence of Raney nickel, until the calculated amount of hydrogen had been absorbed. Thereafter, the catalyst was filtered off, the methanol was distilled out of the filtrate, and the residue was crystallized from a small amount of methanol. 30 gm. of the N-phenyl-N-(2-amino-5 - bromo - phenyl) - amide of ethyl malonate, M.P. 117–118° C., were obtained.

EXAMPLE 2

Using a procedure analogous to that described in Example 1, 1-methyl-5-phenyl-7-bromo-1H-1,5-benzodiazepine-2,4-(3H,5H)-dione, M.P. 202–204° C., of the formula

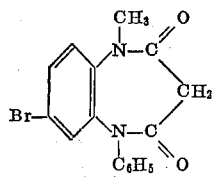

was prepared from the N-phenyl-N-(2-amino-5-bromophenyl)-amide of ethyl malonate and subsequent methylation.

EXAMPLE 3

Using a procedure analogous to that described in Example 1, 1-ethyl-5-phenyl-7-bromo-1H-1,5-benzodiazepine-2,4-(3H,5H)-dione, M.P. 201–203° C., of the formula

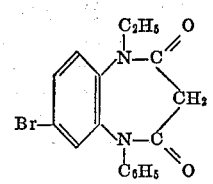

was prepared from the N-phenyl-N-(2-amino-5-bromophenyl)-amide of ethyl malonate and subsequent ethylation.

EXAMPLE 4

Using a procedure analogous to that described in Example 1, 1-methyl-5-(o-bromo-phenyl)-7-bromo-1H-1,5-benzodiazepine-2,4-(3H,5H)-dione, M.P. 205–208° C., of the formula

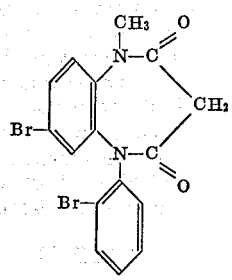

was prepared from the N-(o-bromo-phenyl)-N-(2-amino-5-bromo-phenyl)-amide of ethyl malonate and subsequent methylation.

EXAMPLE 5

Using a procedure analogous to that described in Example 1, 1-methyl-5-(o-chloro-phenyl)-7-bromo-1H-1,5-benzodiazepine-2,4-(3H,5H)-dione, M.P. 179–181° C., of the formula

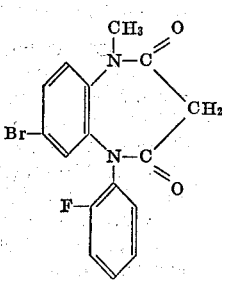

was prepared from the N-(o-fluoro-phenyl)-N-(2-amino-5-bromo-phenyl)-amide of ethyl malonate and subsequent methylation.

EXAMPLE 6

Using a procedure analogous to that described in Example 1, 1-methyl-5-(o-chloro-phenyl)-7-bromo-1H-1,5-benzodiazepine-2,4-(3H,5H)-dione, M.P. 210–212° C., of the formula

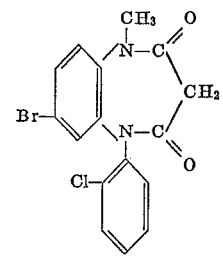

was prepared from the N-(o-chloro-phenyl)-N-(2-amino-5-bromo-phenyl)-amide of ethyl malonate and subsequent methylation.

EXAMPLE 7

Using a procedure analogous to that described in Example 1, 1-ethyl-5-(o-fluoro-phenyl)-7-bromo-1H-1,5-benzodiazepine-2,4-(3H,5H)-dione, M.P. 226–228° C., of the formula

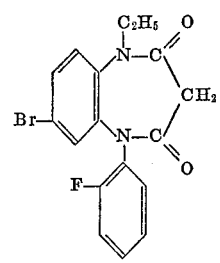

was prepared from the N-(o-fluoro-phenyl)-N-(2-amino-5-bromo-phenyl)-amide of ethyl malonate and subsequent ethylation.

EXAMPLE 8

Using a procedure analogous to that described in Example 1, 1-(β-hydroxy-ethyl)-5-phenyl-7-bromo-1H-1,5-benzodiazepine-2,4-(3H,5H)-dione, M.P. 203–206° C., of the formula

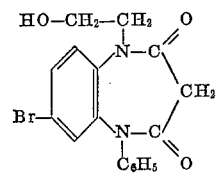

was prepared from the N-phenyl-N-(2-amino-5-bromophenyl)-amide of ethyl malonate and subsequent reaction with ethylene oxide.

EXAMPLE 9

Using a procedure analogous to that described in Example 1, 1-(cyclopropyl-methyl)-5-phenyl-7-bromo-1H-1,5-benzodiazepine-2,4-(3H,5H)-dione, M.P. 205° C., of the formula

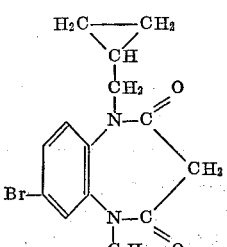

was prepared from the N-phenyl-N-(2-methylamino-5-bromo-phenyl)-amide of ethyl malonate and subsequent alkylation with cyclopropylbromide.

The compounds according to the present invention, that is, those embraced by Formula I above, have useful pharmacodynamic properties. More particularly, they exhibit very effective psychosedative (tranquilizing) and anticonvulsive activities in warm-blooded animals, such as mice, rats and dogs, coupled with low toxicity.

Particularly effective are compounds of the Formula I wherein $R_1$ is hydrogen, methyl or ethyl, and $R_2$ is hydrogen or fluorine, and especially 1-ethyl-5-phenyl-7-bromo-1H-1,5-benzodiazepine-2,4-(3H,5H)-dione and 1-ethyl-5-(o-fluoro-phenyl) - 7 - bromo-1H-1,5-benzodiazepine-2,4-(3H,5H)-dione.

The tranquilizing activity of the 7-bromo-compounds according to the present invention and that of the analogous 7-chloro-compounds was ascertained by means of the standard pharmacological test method of J. R. Boissier, Therapie 19, 571–589 (1964).

Briefly summarized, the test apparatus consists of a square sheet of plywood, 40 x 40 cm., having a leg a few centimeters high at each corner; 16 regularly spaced circular holes, each 3 cm. in diameter, are drilled into the plywood. The raised, perforated sheet of plywood is placed on a horizontal surface and illuminated from above by a source of light. An untreated laboratory mouse is placed into the space between the plywood sheet and the supporting surface; following its natural curiosity or exploration drive, the mouse investigates or explores a given number of lighted holes over a given period of time. The number of holes investigated by the mouse over that period of time is recorded and used as a control value. The compound under investigation for tranquilizing activity is then administered to the mouse, the treated animal is again placed under the sheet of perforated plywood, and the number of investigated holes over the same time period as in the control test is recorded. If the compound under investigation has tranquilizing properties, a linear decrease in the curiosity or exploration drive of the treated animal is observed which manifests itself in a proportionate reduction in the number of holes investigated by the animal, depending upon dosage level and degree of tranquilizing action.

The compounds in the instant case were administered to the test mice perorally in the form of an oil-emulsion. Each compound was tested at four different dosage levels, using five mice per dose. The control values were also obtained from five untreated mice.

From the raw data thus obtained, the dose was calculated for each compound which reduces the exploration drive by 50% over the control animals ($ED_{50}$).

The following table shows the results obtained, as well as the median lethal dose ($LD_{50}$) and the therapeutic index ($LD_{50}/ED_{50}$) for each compound tested:

TABLE

| Compound | $ED_{50}$, mgm./kg. | $LD_{50}$, mgm./kg. | $LD_{50}$ $ED_{50}$ |
|---|---|---|---|
| 7-chloro-5-phenyl-1H,1-5-benzodiazepine-2,4-(3H,5H)-dione | 250 | >2,583 | >10.3 |
| 7-bromo-5-phenyl-1H-1,5-benzodiazepine-2,4-(3H,5H)-dione | 34 | >3,069 | >90.2 |
| 7-chloro-1-methyl-5-phenyl-1H-1,5-benzodiazepine-2,4-(3H,5H)-dione | 35 | 825 | 23.6 |
| 7-bromo-1-methyl-5-phenyl-1H-1,5-benzodiazepine-2,4-(3H,5H)-dione | 15.8 | 1,850 | 117 |
| 7-chloro-1-ethyl-5-phenyl-1H-1,5-benzodiazepine-2,4-(3H,5H)-dione | 39 | >2,826 | >72.5 |
| 7-bromo-1-ethyl-5-phenyl-1H-1,5-benzodiazepine-2,4-(3H,5H)-dione | 10.4 | >3,321 | >311 |

These results clearly show that in each case the 7-bromo-compound is a significantly more effective tranquilizer and has a substantially greater therapeutic ratio than the corresponding 7-chloro-compound.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers powders, solutions, suspensions, emulsions, syrups, suppositories and the like. One effective dosage unit of the compounds according to the present invention is from 0.0166 to 0.833 mgm./kg. body weight, preferably 0.0833 to 0.42 mgm./kg., and the daily dose rate is from 0.166 to 2.5 mgm./kg.

The following examples illustrate a few dosage unit compositions comprising a compound of the instant invention as an active ingredient and represent the best mode contemplated of putting the invention to practical use. The parts are parts by weight unless otherwise specified.

EXAMPLE 10

Coated pills

The pill core composition was compounded from the following ingredients:

| | Parts |
|---|---|
| 1-ethyl-5-phenyl - 7 - bromo-1H-1,5-benzodiazepine-2,4-(3H,5H)-dione | 10.0 |
| Lactose | 28.5 |
| Corn starch | 15.0 |
| Gelatin | 1.0 |
| Magnesium stearate | 0.5 |
| Total | 55.0 |

Compounding procedure

The benzodiazepinedione compound was intimately admixed with the lactose and the corn starch, the mixture was moistened with an aqueous 10% solution of the gelatin, the moist mass was forced through a 1 mm.-mesh screen, and the granulate obtained thereby was dried at 40° C. and again passed through the screen. The dry granulate was admixed with the magnesium stearate, and the mixture was pressed into 55 mgm.-pill cores, which were subsequently coated with a thin shell with the aid of an aqueous suspension of sugar, talcum, titanium dioxide and gum arabic, and the coated pills were polished with beeswax. One coated pill contained 10 mgm. of the benzodiazepinedione compound and, when administered to a warm-blooded animal of about 60 kg. body weight in need of such treatment, produced very good tranquilizing and anticonvulsive effects.

EXAMPLE 11

Suppositories

The suppository composition was compounded from the following ingredients:

| | Parts |
|---|---|
| 1-ethyl-5-(o-fluorophenyl) - 7 - bromo - 1H - 1,5-benzodiazepine-2,4-(3H,5H)-dione | 10.0 |
| Cocoa butter | 1690.0 |
| Total | 1700.0 |

Compounding procedure

The finely powdered benzodiazepinedione compound was stirred, with the aid of an immersion homogenizer, into the cocoa butter which had previously been melted and cooled to about 40° C. The homogenous mixture was then cooled to 35° C. and was poured into cooled suppository molds, each holding 1700 mgm. of the mixture. One suppository contained 10 mgm. of the benzodiazepinedione compound and, when administered by the rectal route to a warm-blooded animal of about 60 kg. body weight in need of such treatment, produced very good tranquilizing and anticonvulsive effects.

Analogous results were obtained when any one of the other benzodiazepinediones embraced by Formula I was substituted for the particular benzodiazepinedione in Examples 10 and 11. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will readily be apparent to others skilled in the art that the invention is not limited to these particular embodiments, and that various changes and modifications may be made without departing from the spirit of the invention or the scope of the appended claims.

We claim:

1. A compound of the formula

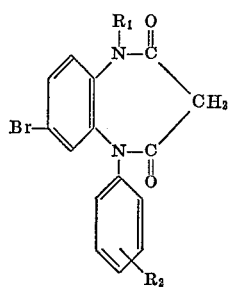

wherein $R_1$ is hydrogen, methyl, ethyl, hydroxyl-ethyl or (cycloalkyl of 3 to 6 carbon atoms)-methyl, and $R_2$ is hydrogen or halogen.

2. A compound according to claim 1, wherein $R_1$ is hydrogen, methyl, ethyl, hydroxy-ethyl or cyclopropyl methyl and $R_2$ is hydrogen, 2-chloro, 2-bromo or 2-fluoro.

3. A compound according to claim 1, wherein $R_1$ is hydrogen, methyl, ethyl or β-hydroxy-ethyl and $R_2$ is hydrogen or 2-fluoro.

4. A compound according to claim 1, which is 1-ethyl-5-phenyl-7-bromo-1H-1,5-benzodiazepine - 2,4 - (3H,5H)-dione.

5. A compound according to claim 1, which is 1-(β-hydroxy-ethyl)-5-phenyl-7-bromo-1H-1,5-benzodiazepine - 2,4-(3H,5H)-dione.

6. A compound according to claim 1, which is 1-ethyl-5-(o-fluoro-phenyl)-7-bromo-1H-1,5 - benzodiazepine - 2,4-(3H,5H)-dione.

References Cited

Yale, "J. Med. Pharm. Chem.," vol. 1, pp. 121–133 (1959).

Buchi et al., "Helv. Chim. Acta," vol. 39, pp. 957–965

HENRY R. JILES, Primary Examiner

R. T. BOND, Assistant Examiner

U.S. Cl. X.R.

424—244